US012789611B2

(12) United States Patent
Hilmann et al.

(10) Patent No.: US 12,789,611 B2

(45) Date of Patent: Nov. 10, 2026

(54) BATTERY ASSEMBLY OF A VEHICLE

(71) Applicant: Ford Global Technologies, LLC, Dearborn, MI (US)

(72) Inventors: Joergen Hilmann, Leverkusen (DE); Istvan Somogyvari, Cologne (DE); Henry W Hausler, New Hudson, MI (US); Daniel Meckenstock, Wuppertal (DE)

(73) Assignee: Ford Global Technologies, LLC, Dearborn, MI (US)

(*) Notice: Subject to any disclaimer, the term of this patent is extended or adjusted under 35 U.S.C. 154(b) by 377 days.

(21) Appl. No.: 18/639,350

(22) Filed: Apr. 18, 2024

(65) Prior Publication Data

US 2024/0383323 A1 Nov. 21, 2024

(30) Foreign Application Priority Data

May 17, 2023 (DE) ......................... 102023113039.0

(51) Int. Cl.
*B60K 1/04* (2019.01)
*B60R 3/00* (2006.01)

(52) U.S. Cl.
CPC ................ *B60K 1/04* (2013.01); *B60R 3/002* (2013.01); *B60K 2001/0438* (2013.01)

(58) Field of Classification Search
CPC .... B60K 1/04; B60K 2001/0438; B60R 3/002
See application file for complete search history.

(56) References Cited

U.S. PATENT DOCUMENTS

| | | | | |
|---|---|---|---|---|
| 7,513,518 | B1 * | 4/2009 | Mayville | B60R 3/002 280/169 |
| 10,086,880 | B2 * | 10/2018 | Son | H01M 50/249 |
| 10,583,714 | B2 * | 3/2020 | Ogawa | B60H 1/246 |
| 11,524,606 | B2 * | 12/2022 | Lee | B60L 50/66 |
| 11,813,933 | B2 * | 11/2023 | Kang | B62D 21/157 |
| 11,955,650 | B2 * | 4/2024 | An | B60K 1/04 |
| 2009/0184485 | A1 * | 7/2009 | Castillo | B60R 3/002 293/126 |
| 2022/0340212 | A1 * | 10/2022 | Danneberg | B62D 25/025 |
| 2024/0383323 | A1 * | 11/2024 | Hilmann | B60K 1/04 |

FOREIGN PATENT DOCUMENTS

| | | | | |
|---|---|---|---|---|
| DE | 102011119540 A1 | | 5/2013 | |
| DE | 112014002554 T5 | | 3/2016 | |
| DE | 102017105709 A1 | | 9/2018 | |
| DE | 102020130500 A1 | | 6/2021 | |
| DE | 102021102065 A1 | | 2/2022 | |
| WO | WO-2024022703 A1 | * | 2/2024 | B60K 1/04 |

* cited by examiner

*Primary Examiner* — Jacob B Meyer
(74) *Attorney, Agent, or Firm* — Burr & Forman; Lorne Forsythe

(57) ABSTRACT

A battery assembly of a vehicle may include a traction battery, and a support structure on which the traction battery is mounted. The support structure has crossmembers and longitudinal members. The support structure is connected to sills of the vehicle. The vehicle has energy-absorbing running boards arranged on both lateral sides of the vehicle. Each of the energy-absorbing running boards is attached directly to the crossmembers of the support structure.

11 Claims, 3 Drawing Sheets

BATTERY ASSEMBLY OF A VEHICLE

TECHNICAL FIELD

Example embodiments generally relate to a support structure for a battery assembly of a vehicle.

BACKGROUND

Batteries for electric and hybrid electric vehicles are accommodated with as much protection as possible, often centrally below the passenger compartment floor, where the battery is protected by crossmembers and sills, wherein the term "sill" in this document is intended to include all possible side frame structures with a greater or lesser stabilizing effect which are located approximately at the level of the floor.

In the case of the action of a force exerted on an obstacle at the front or rear, the central underfloor region forms a relatively safe zone for the battery. In the case of the action of a lateral force, however, vehicle sills and crossmembers tend to be displaced and/or to bend in the transverse direction. Moreover, when such a force is exerted by an impactor, the floor structure may collapse in the direction of the battery. In both cases, there is a risk that a battery compartment in the central underfloor and thus the battery system accommodated therein will be severely compromised. For this reason, a support structure which has crossmembers and longitudinal members may be provided. The support structure is intended to offer protection against the action of a lateral force.

DE 10 2011 119 540 A1 discloses a battery assembly in a vehicle, having a traction battery which is rigidly attached to the vehicle shell and has a support structure with rigid components to protect the traction battery from deformation. A guide means is provided, by means of which the support structure can be displaced relative to the traction battery in the transverse direction of the vehicle in the case of a side impact, while the traction battery remains in an unchanging fixed location on the vehicle shell, being decoupled in terms of motion from the transverse displacement.

A battery mount for receiving battery elements, especially for an electric vehicle, according to DE 10 2017 105 709 A1 has a frame, which forms an inner region and which at least in part forms side walls of the battery mount, having a cover, having a base, and having at least one longitudinal member and at least one crossmember in the inner region of the battery mount to form compartments for the battery elements, wherein a reinforcing structure comprising one or more reinforcing profiles is attached releasably to the battery mount, at least in some region or regions, above the at least one longitudinal member and/or the at least one crossmember.

A system for protecting a battery housing of a vehicle according to DE 10 2020 130 500 A1 comprises a structural blocker, which is configured in such a way that it can be fixedly attached to a side portion of the battery housing, wherein the side portion faces in a lateral direction and extends along a vehicle axis that extends between a front side and a rear side of a vehicle, wherein the battery housing has at least one crossmember, which is aligned in a lateral direction, wherein the structural blocker is configured in such a way that it is aligned with one end of the crossmember and is localized in a region of the side part of the battery housing proximate to the end of the crossmember, wherein the structural blocker is configured in such a way that it transfers a lateral load from a structural component of the vehicle to the crossmember.

A vehicle body fitted with a battery, in accordance with DE 10 2021 102 065 A1, has a lower panel, which extends in a planar direction, wherein a battery is coupled to an upper portion or a lower portion of the lower panel, wherein a door opening/closing device, which is located on a side surface of the lower panel and is coupled to a door of a vehicle in such a way that the door of the vehicle is opened and closed, and wherein a crossmember extending in a transverse direction of the vehicle is coupled to the upper portion or lower portion of the lower panel, and is arranged so as to correspond to the door opening/closing device in the transverse direction.

DE 11 2014 002 554 T5 discloses a mounting structure for a vehicle battery comprising i) a battery frame, which comprises an upper battery frame produced from fiber-reinforced resin, and a lower battery frame produced from a fiber-reinforced resin, and which is arranged on a lower side of a floor panel of a vehicle body and holds the battery; and ii) a deformation element, which has an upper main body portion connected to the upper battery frame, an upper flange portion, which is provided on an outer end portion of the upper main body portion and is continuous in the transverse direction of the vehicle, a lower main body portion connected to the lower battery frame, and a lower flange portion, which is provided in an outer end portion of the lower main body portion and is continuous in the transverse direction of the vehicle, in which the upper flange portion and the lower flange portion overlap and are fixed to one side of a lower surface of the floor panel Based on the discussion above, it may be desirable to protect a battery assembly, especially the traction battery thereof, more effectively from the action of lateral forces by simple means.

BRIEF SUMMARY OF SOME EXAMPLES

The disclosure relates to a battery assembly of a vehicle having a traction battery, which is mounted on a support structure, wherein the support structure has crossmembers and longitudinal members, and wherein the support structure is connected to sills of the vehicle, wherein the vehicle has energy-absorbing running boards arranged on both sides. Each of the energy-absorbing running boards is attached directly to the crossmembers of the support structure.

It should be noted that the features and measures presented individually in the following description can be combined with one another in any technically feasible manner and indicate further embodiments of the invention.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
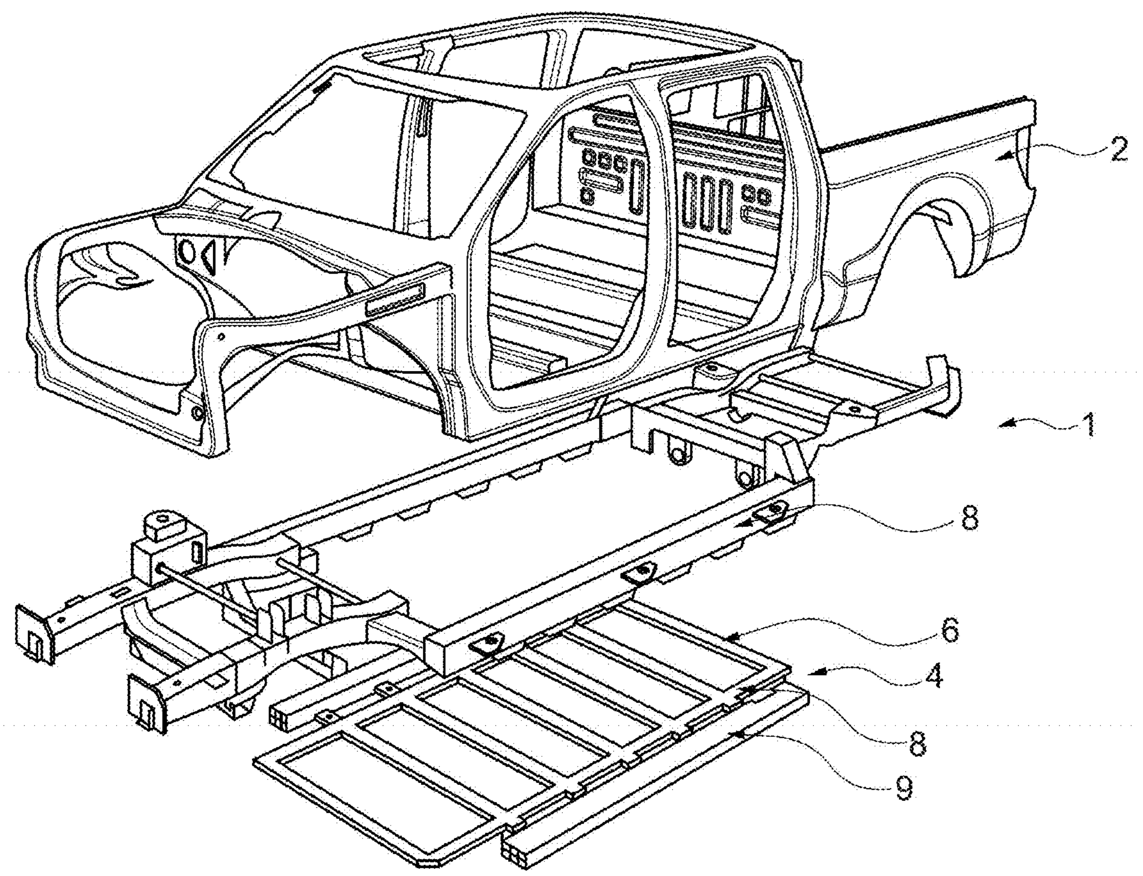
FIG. 1 shows an exploded view of a vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

By means of the invention, it is expediently achieved that loads due to the action of a lateral force acting directly on the energy-absorbing running board are transmitted directly from the energy-absorbing running board into the support structure below the traction battery. As a result, the support structure is moved in the transverse direction of the vehicle together with the traction battery before the frame structure of the vehicle, that is to say, in particular, the sill, is subjected to loads and/or is deformed. This makes it possible to move the traction battery out of the zone of action of force immediately after the initial contact between the lateral force generator and the energy-absorbing running board, and this leads to an immediate enlargement of the survival space for the traction battery.

However, before a displacement of the support structure takes place, the energy-absorbing running board at least partially absorbs the loads due to the action of lateral force, ensuring that the traction battery is protected even better.

A vehicle in the sense according to the invention is a passenger car, a bus, a truck or the like. In particular, it refers to pickups with or without a double cabin and/or to SUVs, which may have an increased ground clearance. To make it easier to get in and out, the vehicle has an energy-absorbing running board. The energy-absorbing running board thus has multiple functions. On the one hand, it makes getting in and out easier. On the other hand, the lateral force in a load case is absorbed. Moreover, the lateral force is transmitted directly into the support structure of the traction battery, which support structure is thus displaced transversely together with the traction battery before the sill is subjected to loads and/or deformed. It will be understood that, in the case of vehicles which do not necessarily require the use of running boards as an aid to getting in and out, the intention is likewise for the invention to include energy-absorbing elements which can provide an initial contact for the agent of the lateral force.

In addition to the traction battery, the vehicle can also have some other drive, e.g. an internal combustion engine, and therefore the invention includes not only battery-electric vehicles (BEV) but also hybrid vehicles, plug-in hybrid vehicles and mild hybrid vehicles.

The traction battery can be accommodated in a battery housing. For example, the traction battery can have a plurality of battery modules, which have battery module housings that are generally cuboidal and elongate in the transverse direction of the vehicle, each contain a plurality of battery cells and are connected to one another by means of flexible leads, wherein the battery module housings extend between lateral sills of the vehicle in the transverse direction of the vehicle, and wherein the battery module housings are arranged one behind the other in the longitudinal direction of the vehicle and are jointly surrounded by the battery housing, wherein the battery module housings can be moved in the transverse direction of the vehicle with respect to one another by the action of a lateral force on the vehicle which deforms the vehicle body, deforming the battery housing in the process. With these measures, it is possible in an effective manner to avoid contact with the sill situated on the opposite side from the side of the vehicle subject to the force, although this is only intended by way of example, and other measures may also be provided, either in isolation and/or in addition, for the avoidance of contact. It is possible here that the attachments to the sill on the opposite side from that subjected to the force (non-impact side) may yield or even fail, allowing the battery housing to give way to the relevant sill, with the laterally acting force being at least partially absorbed.

When viewed in the longitudinal direction of the vehicle, the sill has an outer side and an inner side arranged opposite the latter, which is oriented towards a vehicle center line. It may be desirable if the free ends of the crossmembers project beyond the respective sill on the outside. This enables the energy-absorbing running board to be easily secured on the support structure, in particular on the free ends of the crossmembers. In this context, a material connection, e.g. a welded or adhesive joint, is conceivable, without excluding other possible types of connection. In particular, additional elements, that is to say intermediate pieces, can be arranged on the crossmembers, projecting beyond the respective sill on the outer side thereof. In this embodiment, the intermediate pieces form the free ends of the crossmembers. The stiffness of the additional elements can be designed to match that of the crossmembers. It is also conceivable to make the additional elements energy-absorbing, thus enabling the action of the lateral force to be reduced not only by the energy-absorbing running board but also by the additional element. The additional elements can also be formed integrally with the respective crossmember.

In order to avoid further restricting the ground clearance of the vehicle, despite the underfloor positioning of the battery assembly, provision is preferably made for the sill to have recesses, such that the free ends of the crossmembers are routable past the sill, i.e. can be routed past the sill. For this purpose, the respective sill preferably has on its underside, which faces in the direction of a driving surface, an undulating configuration, with the result that recesses for the free ends of the crossmembers are formed, the said ends projecting beyond the respective sills at the outer side thereof. The recesses are as it were designed as indentations in the underside of the sill, the indentations being matched to the position of the crossmembers. Between the indentations, the respective sill has on its underside elevations that are flattened in the direction of the driving surface. In particular, the transitions between the indentations and the elevations are embodied in such a way as to slope in opposite directions. The undulating structure on the underside of the sill does not have a disadvantageous effect in respect of resistance to the action of lateral, front or rear forces.

In another example embodiment, provision can be made for an outer side of the longitudinal member to be spaced apart from an inner side of the sill. Thus, a transverse gap is preferably formed between the sill and the outer side of the longitudinal member. The transverse gap makes available an additional space for the protection of the traction battery from the action of a lateral force.

In another example embodiment, provision can be made for a respective outer longitudinal member of the support structure to project beyond outer edges of the traction battery, that is to say of the battery housing thereof, in a transverse direction of the vehicle. Thus, a transverse offset is preferably formed between the battery housing and the outer side of the longitudinal member. The transverse offset once again additionally enlarges the space formed by means of the transverse gap for the protection of the traction battery from the action of a lateral force.

In another example embodiment, provision can be made for the inner side of the energy-absorbing running board, the said inner side being arranged relative to an outer side of the respective sill, to be spaced apart from the outer side of the respective sill. In this way, a transverse running-board gap is advantageously formed. The transverse running-board gap makes available an additional space for the protection of the traction battery from the action of a lateral force.

In an ideal embodiment, when viewed in the transverse direction of the vehicle, the invention thus makes a considerable contribution in terms of a safety zone for the protection of the traction battery from the action of a lateral force, wherein the contributions of the transverse running-board gap, the transverse gap and the transverse offset are cumulative.

In another example embodiment, provision can be made for the energy-absorbing running board to have a load distribution element, which is arranged on an inner side of the energy-absorbing running board, the said inner side facing an outer side of the sill. In particular, the load distribution element extends upwards in a z direction from the energy-absorbing running board in order to compensate for a vertical offset between the energy-absorbing running board and the sill. In this case, the load distribution element is embodied in such a way that it covers at least a subsection of the sill. In a load case, the load distribution element can thus come into contact with the outer side of the relevant sill and direct at least some of the lateral force acting on the energy-absorbing running board into the relevant sill over an extended area. In particular, the load distribution element is embodied in the manner of a plate and may also be referred to as a load introduction plate.

In an example embodiment, provision can be made for the support structure, that is to say at least one of the crossmembers, to be connected to the sill by means of an isolating connection. In particular, a plurality of crossmembers, and even all the crossmembers, can be connected to the respective sill concerned by means of a respective isolating connection. In particular, the isolating connection is provided between the underside of the respective sill and an opposite upper side of the crossmember. In the sense according to the invention, an isolating connection is an elastic connection, that is to say a flexible connection. It is conceivable for the isolating connection to be embodied as a rubber element. This is connected in a known manner, e.g. materially, to the sill and to the relevant crossmember, being adhesively bonded to it for example. At the same time, consideration is given to embodying the isolating connection in such a way that the weight-associated forces present, including those of the traction battery, can be absorbed by the respective isolating connection.

In another example embodiment, provision can be made for the traction battery, that is to say the battery housing thereof, to be connected rigidly to at least one of the crossmembers of the support structure. In particular, a plurality or all of the crossmembers can have one or more rigid connections to the traction battery, i.e. to the battery housing.

Figure 2:
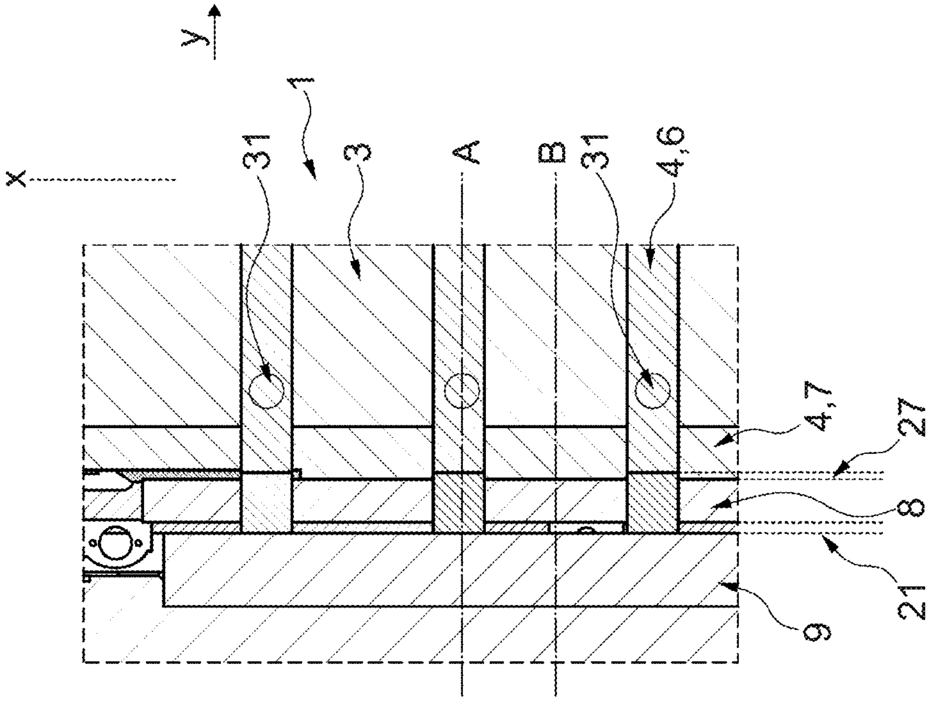
FIG. 2 shows a view of a battery assembly of the vehicle from below according to an example embodiment.

FIGS. 1 and 2 show a battery assembly 1 for a vehicle 2 having a traction battery 3, which is mounted on a support structure 4. The traction battery 3 is most clearly seen in FIG. 2, while the support structure 4 can be seen in FIG. 1, in which the traction battery 3 has been omitted. By way of example, the support structure 4 has seven crossmembers 6 and, for example, two longitudinal members 7. FIG. 1 indicates that the support structure 4 is connected to sills 8 of the vehicle 1. The vehicle has two energy-absorbing running boards 9, which are arranged on each side of the vehicle, and extend at least over the length of an illustrative double cabin 11. The energy-absorbing effect of the energy-absorbing running board 9 is achieved, for example, by its configuration as a hollow body, e.g. with transversely and/or longitudinally extending internal webs. The energy-absorbing running board 9 is attached directly to at least one of the crossmembers 6, preferably to the centrally arranged crossmember 6, in particular to a plurality, preferably all, of the crossmembers 6 of the support structure 4.

FIG. 2 shows a view of the battery assembly 1 from below. Three of the crossmembers 6 and one of the longitudinal members 7, that is to say an outer longitudinal member 7, of the support structure 4 can be seen. The relevant sill 8 is also illustrated. The crossmembers 6 are arranged at the same vertical level as the longitudinal members 7 but below the sill 8. Two section lines A and B are inserted into FIG. 2. Section line A passes through the battery assembly 1 in a position longitudinally adjacent to the crossmembers 6, while section line B passes through the battery assembly 1 but through one of the crossmembers 6. Referring to FIG. 2, the section lines A and B inserted there are therefore each along the transverse direction y of the vehicle.

Figure 3:
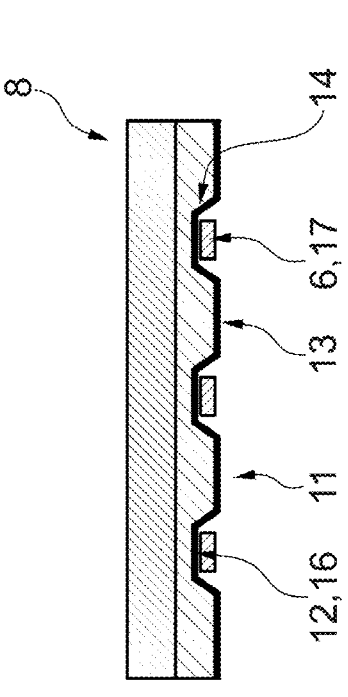
FIG. 3 shows a subsection of a sill as a detail according to an example embodiment.

On its underside 11, which is oriented towards a driving surface, the sill 8 is of undulating design with indentations 12 and flattened elevations 13, as can be seen in FIG. 3. Oppositely sloping transitions 14 are arranged between each of the indentations 12 and the elevations 13.

Recesses 16 are formed by means of the indentations 12, with the result that the free end 17 of the respective crossmember 6 projects beyond an outer side 18 of the sill 8. The energy-absorbing running board 9 is arranged at the free end 17 of the respective crossmember 6.

FIG. 2 shows only one side of the battery assembly 1 and a partial region thereof, while the opposite side to this is of identical design.

Figure 4:
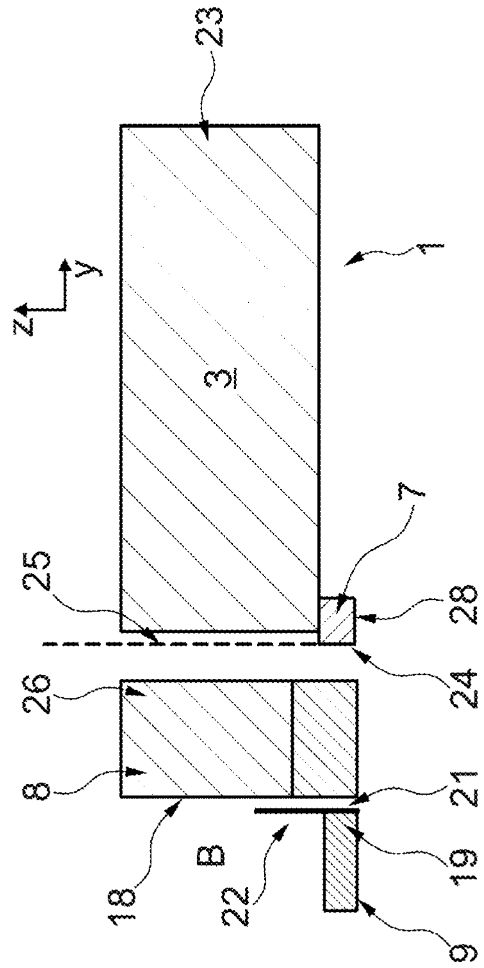
FIG. 4 illustrates the battery assembly of FIG. 2 as a schematic view in a load-free case according to an example embodiment.

FIG. 4 shows the battery assembly 1 in a section along the line B from FIG. 2 in a view from a front or rear side of the vehicle, and therefore the battery assembly 1 is illustrated as it were in a side view. Owing to the section selected, the crossmember 6 is not illustrated. A load-free state is illustrated. The energy-absorbing running board 9 can be seen. The inner side 19 of the latter, which is oriented towards the outer side 18 of the sill 8, is spaced apart, with the result that a transverse running-board gap 21 is formed. Arranged on the inner side 19 of the energy-absorbing running board 9 is a load distribution element 22, which extends upwards in a z direction in the plane of the drawing in FIG. 4, bridges a vertical offset between the energy-absorbing running board 9 and the sill 8, and is made sufficiently long to enable it to make contact with the sill 8 in a force-transmitting manner on the outer side 18 thereof in the load case. The sill 8 is positioned to the left of the energy-absorbing running board 9 in the plane of the drawing in FIG. 4, i.e. closer to the vehicle center line x, which is illustrated in FIG. 2. The longitudinal member 7 is the only part of the support structure 4 which can be seen in FIG. 4. The traction battery 3 is partially supported by means of its battery housing 23 on the longitudinal member 7, wherein the outer side 24 of the longitudinal member 7 projects beyond the battery housing 23, thus giving rise to a transverse offset 25. The outer side 24 of the longitudinal member 7 is spaced apart from the sill 8, i.e. from the inner side 26 thereof, giving rise to a transverse gap 27. On the upper side of the longitudinal member 7, this transverse gap 27 is widened by the amount of the transverse offset 25 of the outer side 24 of the longitudinal member 7 with respect to the battery housing 23. In FIG. 4, it can also be seen that the flattened elevations 13 of the underside 11 of the sill 8 are situated at the same level as an underside 28 of the longitudinal members 7.

In FIGS. 5 to 8, a sectional illustration along the line A from FIG. 2, in a view from a front or rear side of the vehicle, is shown at the top in the respective plane of the drawing, and therefore the battery assembly 1 is illustrated as it were in a side view, while a sectional illustration along the line B from FIG. 2, in a view from a front or rear side of the vehicle, is in each case shown at the bottom in the plane of the drawing, and therefore the battery assembly 1 is illustrated as it were in a side view.

FIG. 5 once again illustrates a load-free battery assembly 1, as shown in FIG. 4. In addition, connections of the sill 8 to the respective crossmember 6 and of the battery housing 23 to the crossmembers 6 can be seen. It may be helpful for an isolating connection 29 to be provided between the sill 8 and the crossmembers 6, whereas rigid connections 31 may be employed as a connection between the battery housing 23 and the crossmembers 6. The isolating connection 29 is as it were an elastic, i.e. flexible, connection, it being possible, by way of example, to provide a rubber block, which allows a certain movement of the support structure 4 relative to the sill 8 in the transverse direction y. By means of the rigid connection of the battery housing 23 to the support structure 4, i.e. to the crossmembers 6 thereof, movement relative to one another is avoided. In addition, the rigid connection 31 prevents load-induced buckling of the crossmembers 6, representing a further stabilization measure.

By means of the invention, it is expediently achieved that loads due to the action of a lateral force acting directly on the energy-absorbing running board 9 are transmitted directly from the latter into the support structure 4 below the traction battery 3. As a result, the support structure 4 is moved in the transverse direction of the vehicle 1 together with the traction battery 3 before the frame structure of the vehicle, that is to say, in particular, the sill 8, is subjected to loads and/or is deformed. This makes it possible to move the traction battery 3 out of the zone of action of force immediately after the initial contact between the lateral force generator and the energy-absorbing running board 9, and this leads to an immediate enlargement of the survival space for the traction battery 3.

However, before a displacement of the support structure 3 takes place, the energy-absorbing running board 9 at least partially absorbs the action of the force, ensuring that the traction battery 3 is protected even better. This can be seen by way of example from FIGS. 6 to 8.

Figure 6:
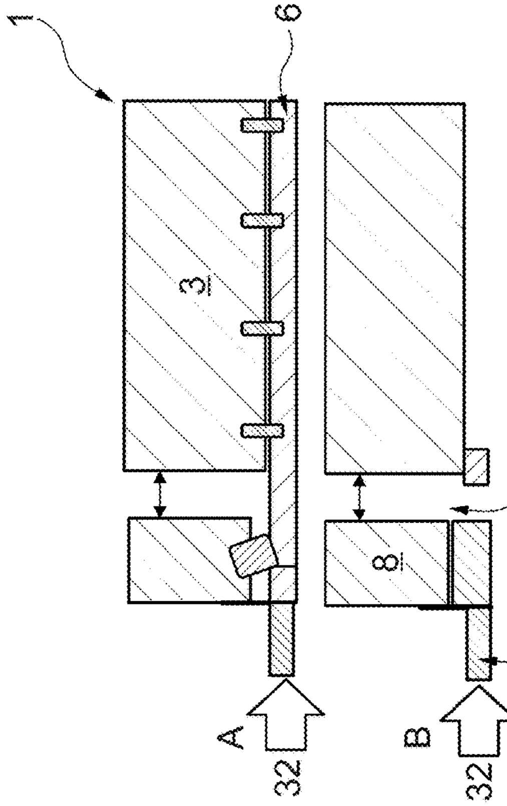
FIG. 6 illustrates a schematic illustration of the battery assembly of FIG. 2 in a first state during a lateral load case according to an example embodiment.
Figure 8:
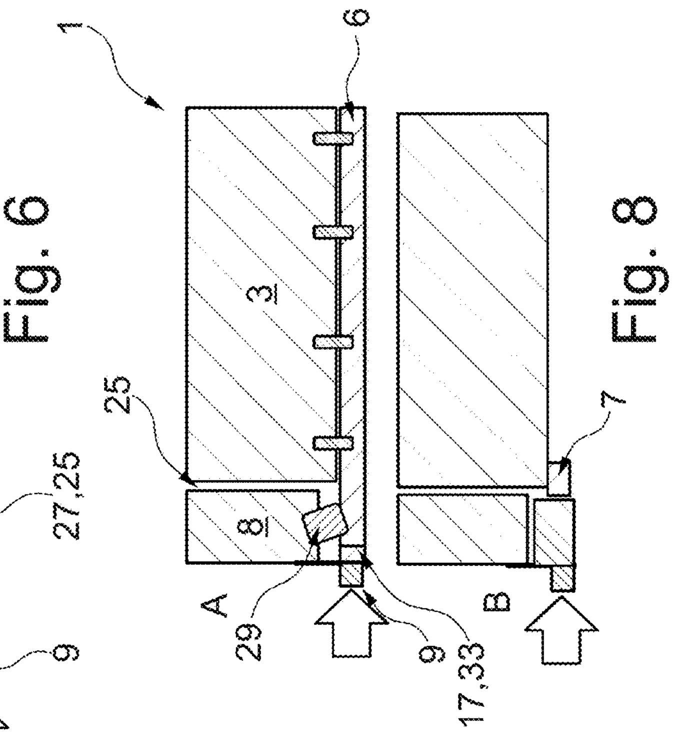
FIG. 8 illustrates a schematic illustration of the battery assembly of FIG. 2 in a third state during a lateral load case according to an example embodiment.
Figure 5:
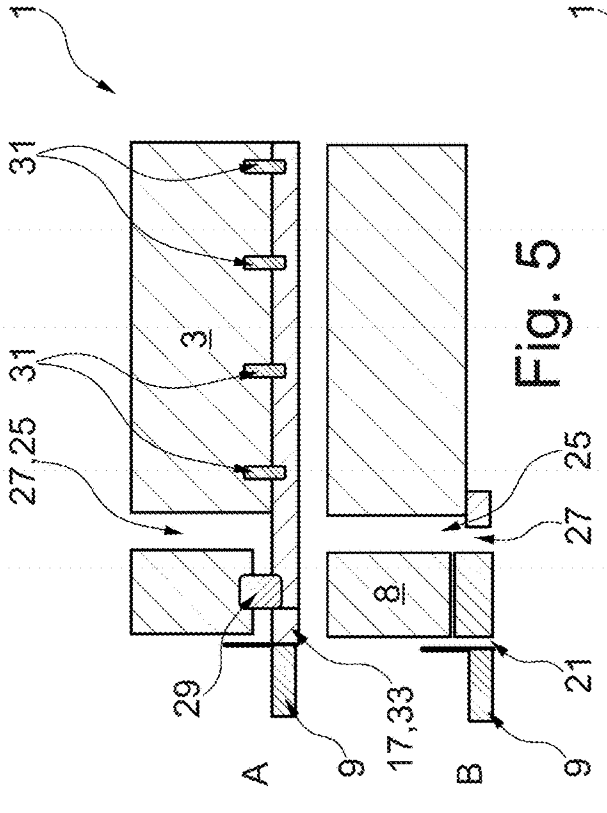
FIG. 5 illustrates the battery assembly of FIG. 2 as a schematic view in a load-free case according to an example embodiment.
Figure 7:
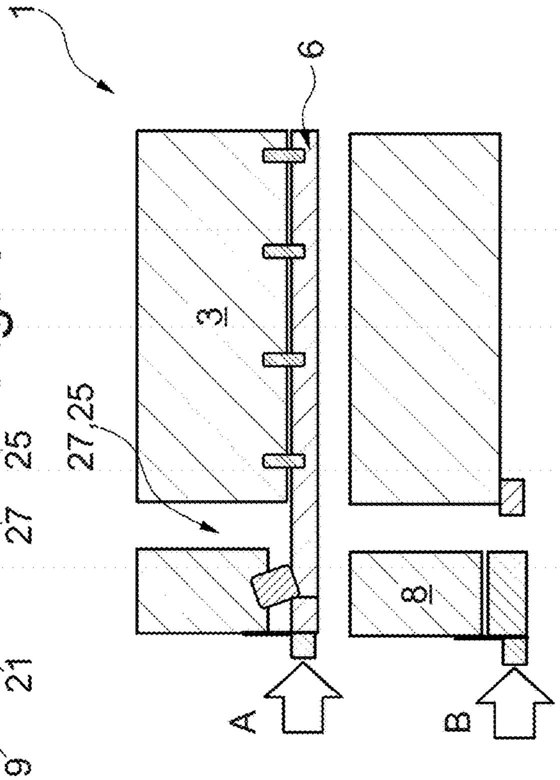
FIG. 7 illustrates a schematic illustration of the battery assembly of FIG. 2 in a second state during a lateral load case according to an example embodiment.

A load case is illustrated by the arrow 32 in each of FIGS. 6 to 8. The load case is the action of a lateral force.

First of all, the isolating connection 29 between the sill 8 and the crossmembers 6 allows a movement of the support structure 4, i.e. of the crossmember 6, relative to the sill 8. In this case, the crossmember 6 is displaced upwards towards the right in the plane of the drawing in FIG. 6, i.e. in the transverse direction of the vehicle, until the transverse running-board gap 21 no longer exists, i.e. is completely closed. The load distribution element 22 makes contact with the sill 8 on its outer side 18. The transverse gap 27 between the outer side 24 of the longitudinal member 7 and the inner side 26 of the sill 8 continues to exist and is widened by the transverse offset 25 of the outer side 23 of the longitudinal member 7 relative to the battery housing 23.

Owing to the continued action of the lateral force, the energy-absorbing running board 9 is pressed together, i.e. compressed, this being illustrated in FIG. 7, with at least some of the laterally acting force being absorbed. Here, the load distribution element 22 is resting against the outer side 18 of the sill 8, which poses a certain resistance to the acting lateral force. In this case, the stiffness of the energy-absorbing running board 9 is less than the stiffness of the sill 8. It is expedient here that the load distribution element 22 transmits some of the laterally acting force into the sill 8.

FIG. 8 illustrates that the energy-absorbing running board 9 and the free end 17 of the crossmember 6 are pressed together. In particular, the free end 17 of the cross-member 6 can be formed by an additional, in some cases compressible, element 33, i.e. an intermediate piece, which can be seen by way of example in the figures. The sill 8 is then displaced in the direction of the support structure 4, i.e. in the direction of the longitudinal member 7 thereof, and makes contact with the latter if the action of the lateral force continues. It can be seen that the transverse gap 27 has been completely eliminated, while the transverse offset 25 between the outer side 24 of the longitudinal member 7 and the battery housing 22 remains. Thus, even in the load case, additional space, namely the transverse offset 25, is available to protect the traction battery 3

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A battery assembly of a vehicle, the battery assembly comprising:

a traction battery; and a support structure on which the traction battery is mounted, wherein the support structure has crossmembers and longitudinal members, wherein the support structure is connected to sills of the vehicle, wherein the vehicle has energy-absorbing running boards arranged on both lateral sides of the vehicle, and wherein each of the energy-absorbing running boards is attached directly to the crossmembers of the support structure.

2. The battery assembly of claim 1, wherein free ends of the crossmembers project beyond a respective one of the sills.

3. The battery assembly of claim 1, wherein the sills each include recesses.

4. The battery assembly of claim 1, wherein each of the sills is of undulating design on an underside of the each of the sills, wherein the undulating design includes indentations and flattened elevations, and wherein the indentations form recesses.

5. The battery assembly of claim 1, wherein an outer side of each of the longitudinal members is spaced apart from the sills.

6. The battery assembly of claim 5, wherein the outer side of each of the longitudinal members is spaced apart from an inner side of the sills.

7. The battery assembly of claim 1, wherein outer sides of each of the longitudinal members project beyond outer edges of the traction battery in a transverse direction of the vehicle.

8. The battery assembly of claim 1, wherein each of the energy-absorbing running boards includes an inner side, wherein the inner side is arranged relative to an outer side of a corresponding one of the sills, and wherein the inner side is spaced apart from the outer side of the corresponding one of the sills.

9. The battery assembly of claim 1, wherein the each of the energy-absorbing running boards has a load distribution element, wherein the load distribution element is arranged on the inner side facing the outer side of the corresponding one of the sills.

10. The battery assembly of claim 1, wherein at least one of the crossmembers is connected to the sills via an isolating connection.

11. The battery assembly of claim 1, wherein the traction battery is connected rigidly to at least one of the crossmembers.

* * * * *